(12) United States Patent
Nakamura

(10) Patent No.: US 9,012,829 B2
(45) Date of Patent: Apr. 21, 2015

(54) SPECTRUM SENSOR AND ANGLE RESTRICTION FILTER

(75) Inventor: Noriyuki Nakamura, Sakata (JP)

(73) Assignee: Seiko Epson Corporation, Tokyo (JP)

( * ) Notice: Subject to any disclaimer, the term of this patent is extended or adjusted under 35 U.S.C. 154(b) by 628 days.

(21) Appl. No.: 13/073,923

(22) Filed: Mar. 28, 2011

(65) Prior Publication Data

US 2011/0233388 A1 Sep. 29, 2011

(30) Foreign Application Priority Data

Mar. 29, 2010 (JP) ................................. 2010-075007

(51) Int. Cl.
*G02B 5/22* (2006.01)
*G02B 5/20* (2006.01)
*G01J 3/02* (2006.01)
*G01J 3/51* (2006.01)
*G02B 5/28* (2006.01)

(52) U.S. Cl.
CPC . *G02B 5/201* (2013.01); *G01J 3/02* (2013.01); *G01J 3/0289* (2013.01); *G01J 3/51* (2013.01); *G01J 3/513* (2013.01); *G02B 5/285* (2013.01)

(58) Field of Classification Search
CPC .................................................. H01L 27/14621
USPC ......... 250/226, 208.1; 359/613; 257/290–292
See application file for complete search history.

(56) References Cited

U.S. PATENT DOCUMENTS

| 6,590,242 | B1 | 7/2003 | Kozuka et al. | |
|---|---|---|---|---|
| 6,649,951 | B2 | 11/2003 | Kozuka et al. | |
| 7,235,831 | B2 | 6/2007 | Kozuka et al. | |
| 2001/0054726 | A1 | 12/2001 | Abe | |
| 2004/0057117 | A1* | 3/2004 | Hodge et al. | 359/614 |
| 2004/0061152 | A1 | 4/2004 | Kashiura et al. | |
| 2006/0038249 | A1 | 2/2006 | Koyama | |
| 2007/0170537 | A1 | 7/2007 | Poenar et al. | |
| 2008/0197652 | A1 | 8/2008 | Stratten | |
| 2009/0244711 | A1* | 10/2009 | Yokoyama et al. | 359/613 |
| 2009/0294634 | A1* | 12/2009 | Kurahashi et al. | 250/208.1 |
| 2010/0133596 | A1 | 6/2010 | Terakawa | |
| 2010/0149672 | A1* | 6/2010 | Lee et al. | 359/885 |
| 2010/0264297 | A1* | 10/2010 | Kurahashi | 250/208.1 |
| 2011/0215432 | A1 | 9/2011 | Uematsu et al. | |
| 2011/0216315 | A1 | 9/2011 | Uematsu et al. | |

FOREIGN PATENT DOCUMENTS

| EP | 1 032 049 A2 | 8/2000 |
|---|---|---|
| JP | 01-217304 A | 8/1989 |
| JP | 06-129908 A | 5/1994 |

(Continued)

OTHER PUBLICATIONS

Non-Final Office Action of Sep. 12, 2012 in related U.S. Appl. No. 13/073,932, filed Mar. 28, 2011, 15 pages.

*Primary Examiner* — Seung C Sohn
(74) *Attorney, Agent, or Firm* — Kilpatrick Townsend & Stockton LLP

(57) ABSTRACT

An angle restriction filter that allows light incident thereon in a predetermined range of incident angles to pass, includes: an optical path wall section formed from a plurality of light shield members laminated in layers including a common material, thereby forming an optical path in a lamination direction of the light shield members; and a light transmission section formed in a region surrounded by the optical path wall section.

16 Claims, 5 Drawing Sheets

(56) References Cited

FOREIGN PATENT DOCUMENTS

| | | |
|---|---|---|
| JP | 09-027606 A | 1/1997 |
| JP | 11-231110 A | 8/1999 |
| JP | 3584196 B2 | 8/2004 |
| JP | 2006-060103 A | 3/2006 |
| JP | 2008-185667 A | 8/2008 |
| JP | 2008-197652 A | 8/2008 |
| JP | 2009-225064 A | 10/2009 |
| JP | 2010-048849 A | 3/2010 |
| JP | 2010-098055 A | 4/2010 |

* cited by examiner

SPECTRUM SENSOR AND ANGLE RESTRICTION FILTER

BACKGROUND

The entire disclosure of Japanese Patent Application No. 2010-075007, filed Mar. 29, 2010 is expressly incorporated by reference herein.

1. Technical Field

The invention relates to spectrum sensors and angle restriction filters.

2. Related Art

Spectrum sensors are used in the medical, agricultural and environmental fields for diagnosing and examining objects. For example, in the medical field, a pulse oximeter is used to measure the oxygen saturation of blood, using light absorption of hemoglobin. Also, in the agricultural field, a saccharometer is used to measure the concentration of sugar content of fruits, using light absorption of sugar.

For example, Japanese Laid-open Patent Application JP-A-6-129908 describes a spectroscopic imaging sensor that restricts incident angles of light with an optical fiber that optically connects between a dichroic filter and a photovoltaic converter device, thereby restricting the transmission wavelength band of light to the photovoltaic converter device.

However, the spectrum sensors of related art entail a problem in that it is difficult to reduce their size. Therefore, placement of numerous sensors in a desired location or permanent placement thereof is difficult.

SUMMARY

In accordance with an advantage of some aspects of the invention, spectrum sensors and angle restriction filters can be reduced in size.

In accordance with an embodiment of the invention, an angle restriction filter includes an optical path wall section formed from a plurality of light shield members laminated in layers including a common material, thereby forming an optical path in a lamination direction of the light shield members, and a light transmission section formed in a region surrounded by the optical path wall section. The angle restriction filter restricts incident angles of light that passes through the optical path. According to the embodiment, the optical path is formed through forming the light shield members in layers on a substrate, such that very fine patterns can be formed, and the angle restriction filter thus can be manufactured in a small size.

In accordance with an aspect of the embodiment, the common material may preferably be a material having a lower reflectance than that of aluminum, for example, tungsten, copper, titanium nitride, titanium-tungsten, titanium, tantalum, tantalum nitride, chrome or molybdenum. In accordance with this aspect, as the light shield members are formed from a material having a low light reflectance, light that hits the wall surface of the optical path while traveling through the optical path can be reduced. Therefore, even a small-sized angle restriction filter can make it harder for light with incident angles exceeding a specified restriction angle range to pass through the optical path.

In the embodiment described above, the optical path wall section and the light transmission section may preferably be formed on a semiconductor substrate, and a plurality of metal layers may preferably be laminated respectively through dielectric layers in a region outside the optical path and the optical path wall section. As the plurality of metal layers forming wiring layers on a semiconductor circuit are formed outside the optical path and the optical path wall section, it is possible to suppress incidence of light reflected from the metal layers in the optical path, which makes it harder for light with incident angles exceeding a specified restriction angle range to pass through the optical path.

In accordance with an aspect of the embodiment described above, the light shield members may preferably be formed from a conductive material, and electrically connected to the plurality of metal layers. Accordingly, the light shield members and the plurality of metal layers are electrically connected to one another, such that the light shield members can be used as a part of the electrical circuit.

In accordance with an aspect of the embodiment described above, the optical path defines a wall surface that may preferably have an inclined section inclined with respect to a direction perpendicular to the substrate. As the wall surface of the optical path has the inclined section, light that may hit the wall surface of the optical pass while traveling through the optical path can be reduced, such that it is possible to make it harder for light with incident angles exceeding a specified restriction angle range to pass through the optical path.

In accordance with another embodiment of the invention, an angle restriction filter includes an optical path wall section formed from a plurality of metal layers laminated in layers on a substrate, and light shield members formed between the plurality of metal layers and having a smaller light reflectance than that of the metal layers, thereby forming an optical path in a lamination direction of the metal layers, and a light transmission section formed in a region surrounded by the optical path wall section. The angle restriction filter restricts incident angles of light that passes through the optical path. According to an aspect of the embodiment, portions of the wall surface of the optical path which are formed by the light shield members are inclined with respect to the direction of the optical path, respectively. In accordance with the embodiment, at least a portion of the wall surface of the optical path is inclined, such that light that may hit the wall surface of the optical path while traveling through the optical path can be reduced, and therefore it is possible to make it harder for light with incident angles exceeding a specified restricting angle range to pass through the optical path.

In accordance with an aspect of the embodiment, the light shield member may preferably be provided on its surface with a film formed from a material having a lower reflectance than that of aluminum, such as, for example, titanium nitride, tungsten, copper, titanium-tungsten, titanium, tantalum, tantalum nitride, chrome or molybdenum. In accordance with this aspect, as the film having a low reflectance is formed on the surface of each of the light shield members, light that hits the wall surface of the optical path while traveling through the optical path can be reduced, and therefore it is possible to make it harder for light with incident angles exceeding a specified restricting angle range to pass through the optical path.

In accordance with another aspect of the embodiment described above, the wall surface of the optical path may preferably be formed with concave and convex portions formed through changing a forming pattern of each of the light shield members at each of the layers. Accordingly, as the wall surface of the optical path has the concave and convex portions, light that hits the wall surface of the optical path while traveling through the optical path can be reduced, and therefore it is possible to make it harder for light with incident angles exceeding a specified restricting angle range to pass through the optical path.

In accordance with still another embodiment of the invention, a spectrum sensor includes the angle restriction filter set forth above, a wavelength restriction filter that restricts wavelengths of light that can pass through the angle restriction filter, and a photodetector device that detects light that has passed through the angle restriction filter and the wavelength restriction filter. According to this embodiment, the angle restriction filter described above is used, such that the spectrum sensor can be manufactured in a small size.

DESCRIPTION OF EXEMPLARY EMBODIMENTS

Preferred embodiments of the invention are described in detail below. It is noted, however, that the embodiments described below do not unduly limit the contents of the invention set forth in the scope of patent claims. Also, not all of the compositions described in the embodiments would necessarily be essential for the solution provided by the invention. Furthermore, the same components will be appended with the same reference numbers, and their description will not be repeated.

1. First Embodiment

Figure 1A:
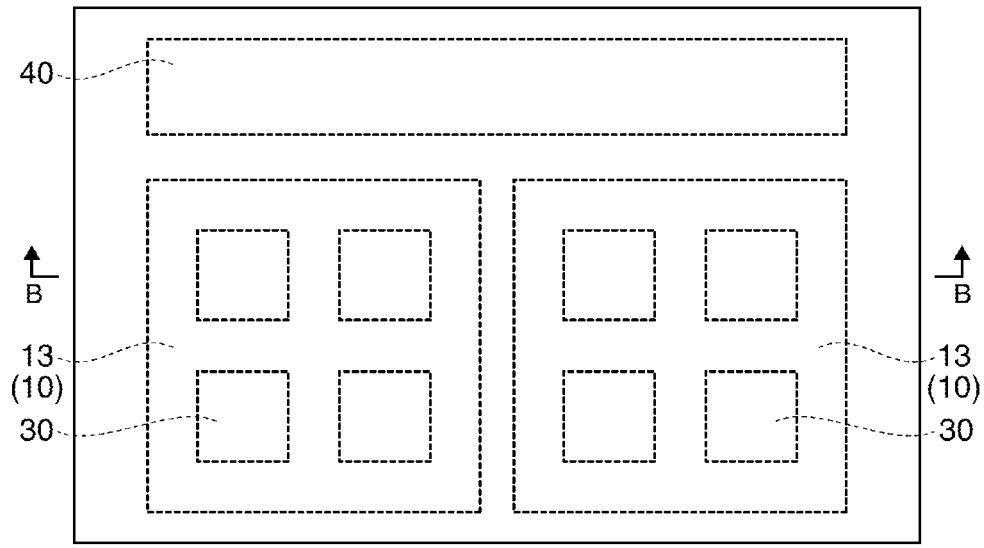
FIGS. 1A and 1B are schematic views showing an angle restriction filter and a spectrum sensor in accordance with a first embodiment of the invention.
Figure 1B:
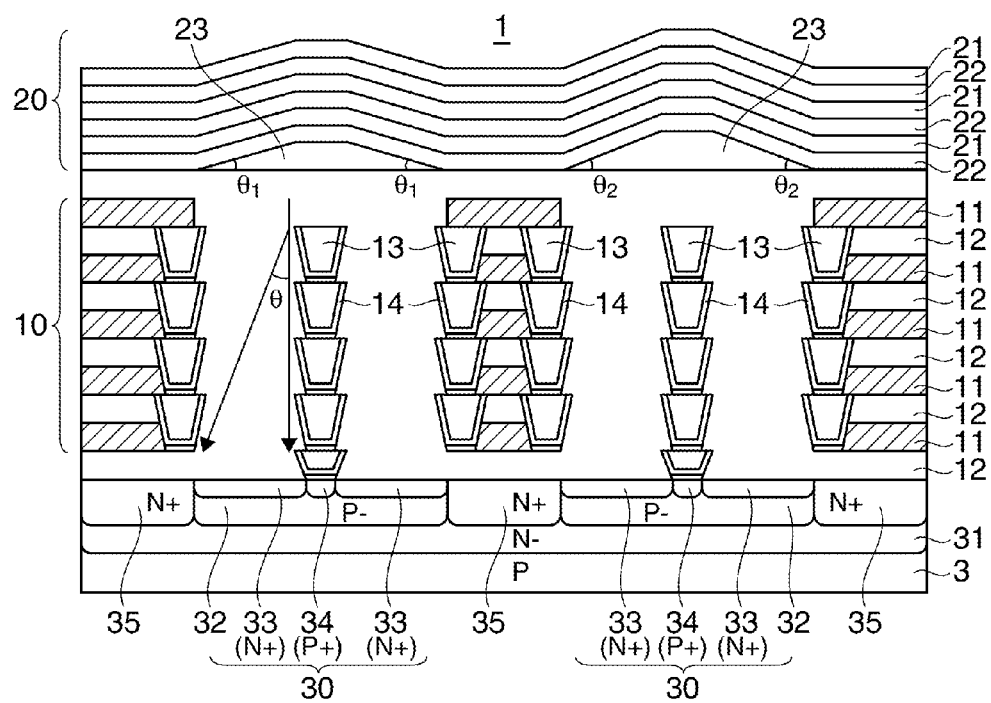

FIGS. 1A and 1B are schematic views of an angle restriction filter 10 and a spectrum sensor 1 in accordance with a first embodiment of the invention. FIG. 1A is a plan view of the spectrum sensor 1, and FIG. 1B is a cross-sectional view taken along lines B-B of FIG. 1A. The spectrum sensor 1 includes the angle restriction filter 10, a wavelength restriction filter 20, and a photodetector device 30 (see FIG. 1B). In FIG. 1A, illustration of the wavelength restriction filter 20 is omitted.

In a P type silicon substrate 3 that serves as a semiconductor substrate where the spectrum sensor 1 is formed, an electronic circuit 40 is formed for applying a predetermined reverse bias voltage to the photodetector device 30, detecting a current based on photovoltaic power generated at the photodetector device 30, amplifying an analog signal according to the magnitude of the current, converting the analog signal to a digital signal and the like (see FIG. 1A). A plurality of aluminum (Al) alloy layers for wiring (not shown) are connected to semiconductor elements composing the electronic circuit 40, thereby providing electrical connections among the semiconductor elements composing the electronic circuit 40, and electrical connections between the electronic circuit 40 and external components.

Conductive plugs (not shown) are connected between the plurality of aluminum alloy layers. The conductive plugs electrically connect adjacent upper and lower ones of the aluminum alloy layers at places where the conductive plugs are provided.

1-1. Angle Restriction Filter

As shown in FIG. 1B, the angle restriction filter 10 is formed on the P type silicon substrate 3 in which the photodetector device 30 is formed. In the angle restriction filter 10 of the present embodiment, an optical path wall section is formed by light shield members 13 composed of conductive plugs that are formed by the same process used for the conductive plugs on the above-described electronic circuit 40. The light shield members 13 are formed from tungsten (W) but may be formed from a material other than tungsten. For example, the light shield members 13 may be formed from a material having a reflectance of light with wavelengths to be received by the photodetector device 30 lower than the reflectance of aluminum, such as, for example, copper, titanium nitride, titanium-tungsten, titanium, tantalum, tantalum nitride, chrome or molybdenum.

Also, the P type silicon substrate 3 is provided thereon with aluminum alloy layers 11 as a plurality of metal layers formed by the same multilayer wiring process used for the aluminum alloy layers on the electronic circuit 40, which are laminated through silicon oxide ($SiO_2$) layers 12 serving as insulation layers each having light transmissivity (in other words, light transmissivity to light having wavelengths to be received by the photodetector device 30, which similarly applies to the description below). The embodiment is not limited to the aluminum alloy layers, and the plurality of layers 11 may be composed of copper (Cu) alloy layers.

The light shield members 13 are composed of a material that does not substantially transmit light with wavelengths to be received by the photodetector device 30, and may be continuously formed in a plurality of layers in a predetermined pattern, for example, a lattice configuration on the P type silicon substrate 3, such that an optical path in the lamination direction of the light shield members 13 is formed.

Incident angles of light that pass through the optical path are restricted by the optical path wall sections formed with the light shield members 13. More specifically, when light incident upon the optical path is inclined more than a predetermined restriction angle θ (see FIG. 1B) with respect to the direction of the optical path, the light hits the light shield members 13, whereby a portion of the light is absorbed by the light shield members 13, and the remaining portion is reflected. The reflection is repeated until the light passes through the optical path, whereby the reflected light becomes weaker. Therefore, light that can pass through the angle restriction filter 10 is restricted, substantially, to light having incident angles with respect to the optical path being less than the predetermined restriction angle θ.

Areas surrounded by the light shield members 13 are composed of the above-described silicon oxide layer 12 having light transmissivity, and thus function as light transmission sections that transmit incident light.

In the embodiment described above, the light shield members 13 are formed in multiple layers in a predetermined lattice pattern on the P type silicon substrate 3, thereby forming the optical path wall sections. Therefore, very fine patterns can be formed, and the angle restriction filters 10 can be manufactured in a small size. Further, compared to a spectrum sensor that is formed by bonding members together, the manufacturing process can be simplified, and a reduction in transmission light by adhesive can be suppressed.

In accordance with a preferred embodiment, the light shield members 13 are formed from the same material (tungsten, or the like) as that of the conductive plugs described above. By this, the angle restriction filter 10 can be formed by the semiconductor process at the same time when the aluminum alloy layers for wirings for the electronic circuit 40 and the conductive plugs are formed on the same P type silicon substrate 3.

In accordance with a preferred embodiment, the aluminum alloy layers 11 may be formed in a region outside the optical path surrounded by the light shield members 13 and the optical path wall sections formed with the light shield members. In accordance with a more preferred embodiment, the optical path wall surface may be formed only from the light shield members 13, not from the aluminum alloy layers 11 having a high light reflectance. As a result, it is possible to suppress incidence of light reflected from the aluminum alloy layers 11 having a high light reflectance in the optical path, and therefore it is possible to make it harder for light with incident angles exceeding the restriction angle range to pass through the optical path.

Furthermore, in accordance with another preferred embodiment, the wall surface of the optical path surrounded by the light shield members 13 is inclined with respect to a direction perpendicular to the P type silicon substrate 3. More specifically, the light shield member 13 in each of the layers has a cross-sectional shape wider toward its upper side (on the side of the wavelength restriction filter 20), such that the wall surface of the light shield member 13 is oriented slightly downward. Due to the inclined wall surface of the optical path, when light that has entered the optical path of the angle restriction filter 10 hits the wall surface of the optical path, its reflection direction becomes more complex. Accordingly, reflections of incident light within the optical path are repeated many times until the incident light has passed through the optical path, whereby the reflected light becomes weaker. Therefore, it is possible to make it harder for light having incident angles exceeding the restriction angle range to pass through the optical path.

In accordance with a preferred embodiment, a titanium nitride (TiN) film 14 that serves as an adhesive layer between tungsten and silicon oxide is formed on the surface of each of the light shield members 13. However, without any limitation to the aforementioned material, each of the light shield members 13 may be provided on its surface with a low reflection film formed from a material having a reflectance of light with wavelengths to be received by the photodetector device 30 lower than that of aluminum, for example, titanium nitride, tungsten, copper, titanium-tungsten, titanium, tantalum, tantalum nitride, chrome or molybdenum.

Also, in accordance with another preferred embodiment, the light shield members 13 are electrically connected to the aluminum alloy layers 11 through side surfaces of the aluminum alloy layers 11. As fourth semiconductor regions 34 (to be described below) to be formed on the P type silicon substrate 3 are electrically connected to the bottom ends of the light shield members 13, electrical connection between the photodiode device 30 and the aluminum alloy layers 11 can be achieved.

1-2. Wavelength Restriction Filter

The wavelength restriction filter 20 is formed on the angle restriction filter 10, and is composed of a plurality of laminated layers of thin films of a low refractive index 21 such as silicon oxide ($SiO_2$) and thin films of a high refractive index 22 such as titanium oxide ($TiO_2$), which are slightly tilted with respect to the P type silicon substrate 3. The thin films of a low refractive index 21 and the thin films of a high refractive index 22 each having a predetermined film thickness on the order of, for example, submicron, are laminated, for example, in about 60 layers in total, thereby forming, for example, a thickness of about 6 µm on the whole.

Tilt angles $\theta_1$ and $\theta_2$ of the low refractive index thin films 21 and the high refractive index thin films 22 with respect to the P type silicon substrate 3, may be set at, for example, 0 degree or greater but 30 degrees or smaller, according to set wavelengths of light to be received by the photodetector device 30.

In order to have the low refractive index thin films 21 and the high refractive index thin films 22 tilted with respect to the P type silicon substrate 3, for example, a tilt structure 23 having transmissivity is formed on the angle restriction filter 10, and the low refractive index thin films 21 and the high refractive index thin films 22 are formed on the tilt structure 23. The tilt structure 23 may be formed by, for example, depositing a silicon oxide layer on the angle restriction filter 10 and processing the silicon oxide layer by a CMP (chemical mechanical polishing) method.

In this manner, by forming in advance the tilt structures 23 having the tilt angles $\theta_1$ and $\theta_2$ that are different depending on the set wavelengths of light to be received by the photodetector device 30, the low refractive index thin films 21 and the high refractive index thin films 22 can be formed each in the same thickness by a common process, without regard to the set wavelengths of light to be received by the photodetector device 30.

The wavelength restriction filter 20 having such a structure described above restricts wavelengths of light (light that can pass through the angle restriction filter 10) incident on the angle restriction filter 10 within the predetermined range of restricting angles. More specifically, a portion of incident light that has entered the wavelength restriction filter 20 becomes reflected light and another portion thereof becomes transmitting light at an interface between a set of the low refractive index thin film 21 and the high refractive index thin film 22. Then, a portion of the reflected light reflects again at an interface between another set of the low refractive index thin film 21 and the high refractive index thin film 22, and couples with the aforementioned transmitting light. In this instance, when light has a wavelength that matches with the optical path length of reflected light, the reflected light and the transmitting light match in phase with each other, and thus strengthen each other. When light has a wavelength that does not match with the optical path length of reflected light, the reflected light and the transmitting light do not match in phase with each other, and thus weaken each other (destructively interfere with each other).

The optical path length of reflected light is determined by the tilt angles of the low refractive index thin film 21 and the high refractive index thin film 22 with respect to the direction of the incident light. Accordingly, when the interference action described above is repeated in the low refractive index thin films 21 and the high refractive index thin films 22, which amount to the total of sixty layers, light having only specific wavelengths can pass through the wavelength restriction filter 20, according to the incident angle of incident light, and are emitted from the wavelength restriction filter 20 at a predetermined emission angle (for example, at the same angle as the incident angle to the wavelength restriction filter 20).

The angle restriction filter 10 allows only light incident on the angle restriction filter 10 in the predetermined range of restriction angles to pass therein. Accordingly, the wavelengths of light that passes through the wavelength restriction filter 20 and the angle restriction filter 10 are restricted to a predetermined range of wavelengths which is determined by the tilt angles $\theta_1$ and $\theta_2$ of the low refractive index thin films 21 and the high refractive index thin films 22 with respect to the P type silicon substrate 3, and the range of restriction angles of incident light allowed to pass by the angle restriction filter 10.

1-3. Photodetector Device

The photodetector device 30 is an element that receives light that has passed through the wavelength restriction filter 20 and the angle restriction filter 10, and converts the light to photovoltaic power.

The photodetector device 30 includes various kinds of semiconductor regions that are formed in the P type silicon substrate 3 by ion implantation or the like. The semiconductor regions formed in the P type silicon substrate 3 include, for example, a first semiconductor region 31 of a first conductivity type; a second semiconductor region 32 of a second conductivity type formed on the first semiconductor region 31; a third semiconductor region 33 of the first conductivity type formed on the second semiconductor region 32; and a fourth semiconductor region 34 of the second conductivity type formed on the second semiconductor region 32, being surrounded by the third semiconductor region 33, and including an impurity having a higher concentration than that of the second semiconductor region 32. In this embodiment, the first conductivity type is, for example, N type, and the second conductivity type is, for example, P type.

The first semiconductor region 31 is electrically connected to the third semiconductor region 33 through a fifth semiconductor region 35 of the first conductivity type. The first semiconductor region 31 is connected to a first external electrode (not shown) through the fifth semiconductor region 35. The fourth semiconductor region 34 is connected to a bottom end of the angle restriction filter 10, and the angle restriction filter 10 is further connected to a second external electrode (not shown). A reverse bias voltage can be applied to the PN junction formed between the first semiconductor region 31 and the second semiconductor region 32 through the first external electrode and the second external electrode.

In the embodiment described above, the fourth semiconductor region 34 is electrically connected to the second external electrode through the angle restriction filter 10 such that it is not necessary to provide conductive members for wiring other than the angle restriction filter 10 on the photodetector device 30, and therefore a reduction in the amount of receiving light by such wirings can be avoided.

As light that has passed through the angle restriction filter 10 is received by the photodetector device 30, photovoltaic power is generated at the PN junction formed between the first semiconductor region 31 and the second semiconductor region 32, whereby an electrical current is generated. By detecting the electrical current by an electronic circuit connected to the first external electrode or the second external electrode, the light received by the photodetector device 30 can be detected.

It is noted that FIGS. 1A and 1B show a first photodetector device 30 that receives light with wavelengths determined by the tilt angle $\theta_1$ of the wavelength restriction filter 20, and a second photodetector device 30 that receives light with wavelengths determined by the tilt angle $\theta_2$. In FIG. 1B, the angle restriction filter 10 connected to the fourth semiconductor region 34 of the first photodetector device 30 and the angle restriction filter 10 connected to the fourth semiconductor region 34 of the second photodetector device 30 are connected to each other by the aluminum alloy layers 11. Without any limitation to this structure, the angle restriction filters 10 that are independently connected to the respective photodetector devices 30 may not be mutually connected, and independent signals of received light may be made to be detected independently from the respective independent photodetector devices 30.

1-4. Manufacturing Method in accordance with First Embodiment

Here, a method for manufacturing the spectrum sensor 1 in accordance with the first embodiment will be briefly described. The spectrum sensor 1 is manufactured through initially forming the photodetector device 30 on the P type silicon substrate 3, then forming the angle restriction filter 10 on the photodetector device 30, and then forming the wavelength restriction filter 20 on the angle restriction filter 10.

First, the photodetector device 30 is formed on the P type silicon substrate 3. For example, at first, a first semiconductor region 31 of N type is formed by ion injection or the like in the P type silicon substrate 3. Then, a fifth semiconductor region 35 of N type and a second semiconductor region 32 of P type are formed by ion injection or the like applied to the first semiconductor region 31. Then, a fourth semiconductor region 34 of P type and a third semiconductor region 33 of N type are formed by further conducting ion injection or the like applied to the second semiconductor region 32. The above-described steps may be conducted concurrently with formation of the electronic circuit 40 on the same P type silicon substrate 3.

Next, the angle restriction filter 10 is formed on the photodetector device 30. FIGS. 2A-2E are views showing the steps of forming the angle restriction filter.

Figure 2A:
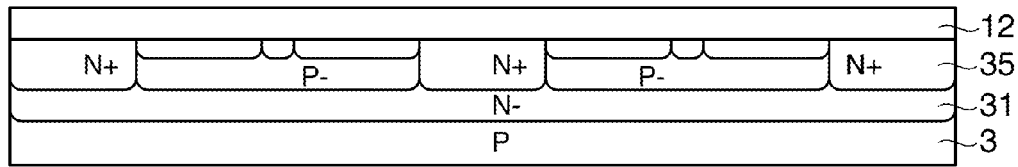
FIGS. 2A-2E are views showing steps of forming the angle restriction filter.

(1) First, a silicon oxide layer 12 of the first layer is formed with silicon oxide or the like on the P type silicon substrate 3 where the photodetector device 30 is formed (FIG. 2A).

Figure 2B:
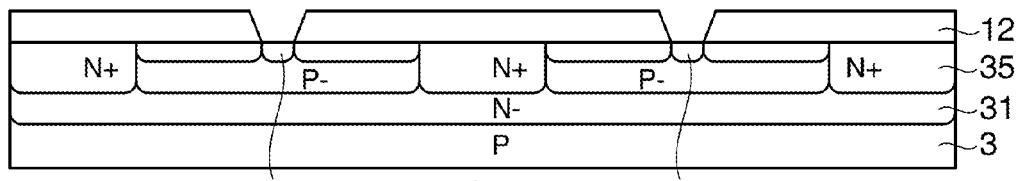

(2) Then, grooves are formed in the silicon oxide layer 12 by etching a portion of the silicon oxide layer 12 (regions above the fourth semiconductor regions 34) (FIG. 2B).

Figure 2C:
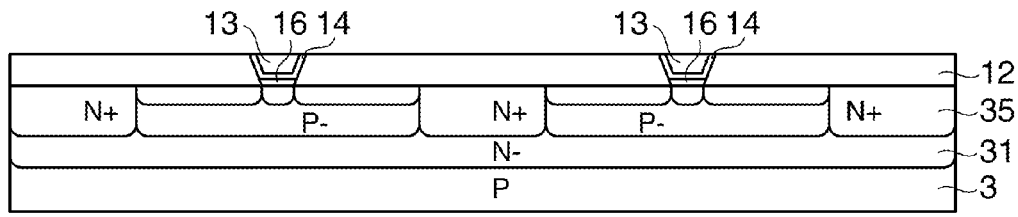

(3) Then, titanium (Ti) films 16 are formed on the bottom surfaces of the grooves formed in the silicon oxide layer 12, titanium nitride films 14 are formed on the bottom surfaces and inner side surfaces of the grooves, and further tungsten light shield members 13 in the first layer are embedded in the grooves. The light shield members 13 are formed concurrently with formation of conductive plugs for connecting aluminum alloy layers for wiring for the electronic circuit 40 (FIG. 2C).

Figure 2D:
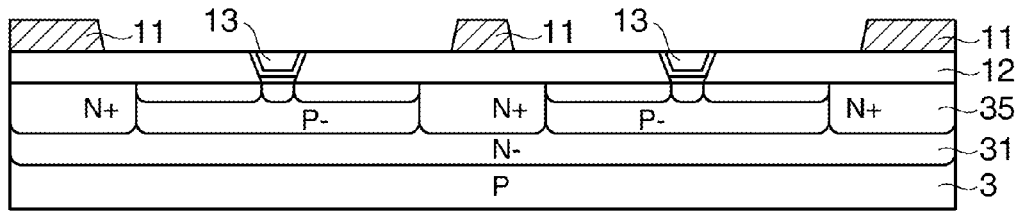

(4) Then, an aluminum alloy layer 11 of the first layer is formed concurrently with formation of an aluminum alloy layer for wiring for the electronic circuit 40 (FIG. 2D). It is preferred that a titanium film and a titanium nitride film may be formed on the bottom surface and the upper surface of the aluminum alloy layer 11, respectively.

Figure 2E:
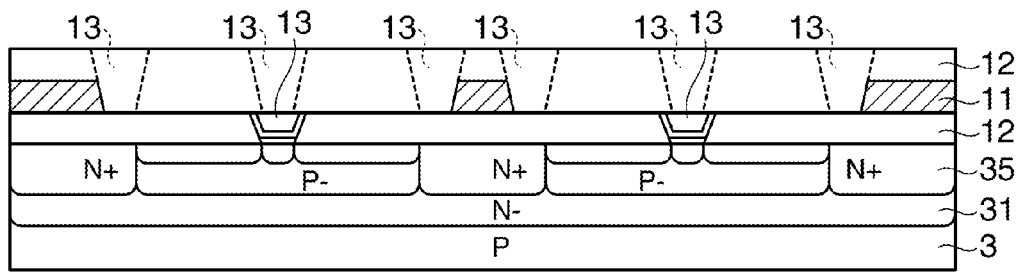

(5) Then, a silicon oxide layer 12 of the second layer is formed on the silicon oxide layer 12 of the first layer, the light shield member 13 of the first layer and the aluminum alloy layer 11 of the first layer (FIG. 2E).

By repeating the steps (2)-(5) in a predetermined number of times, the angle restriction filter 10 is formed. It is noted that light shield members 13 of the second layer are formed on the light shield members 13 of the lower layer or on the silicon oxide layer 12 of the lower layer, not on the aluminum alloy layer 11 (see FIG. 2E). Light shield members 13 of the third layer and above are formed on the light shield members 13 in the lower layer, respectively, not on the aluminum alloy layer 11.

Next, the wavelength restriction filter 20 is formed on the angle restriction filter 10 (see FIG. 1). For example, at first, a silicon oxide layer is formed on the angle restriction filter 10, and the silicon oxide layer is processed into a tilt structure 23 having a predetermined angle by a CMP method or the like.

Then, thin films of a lower refractive index 21 and thin films of a higher refractive index 22 are alternately laminated in multiple layers. The spectrum sensor 1 is manufactured through the steps described above.

2. Second Embodiment

Figure 3:
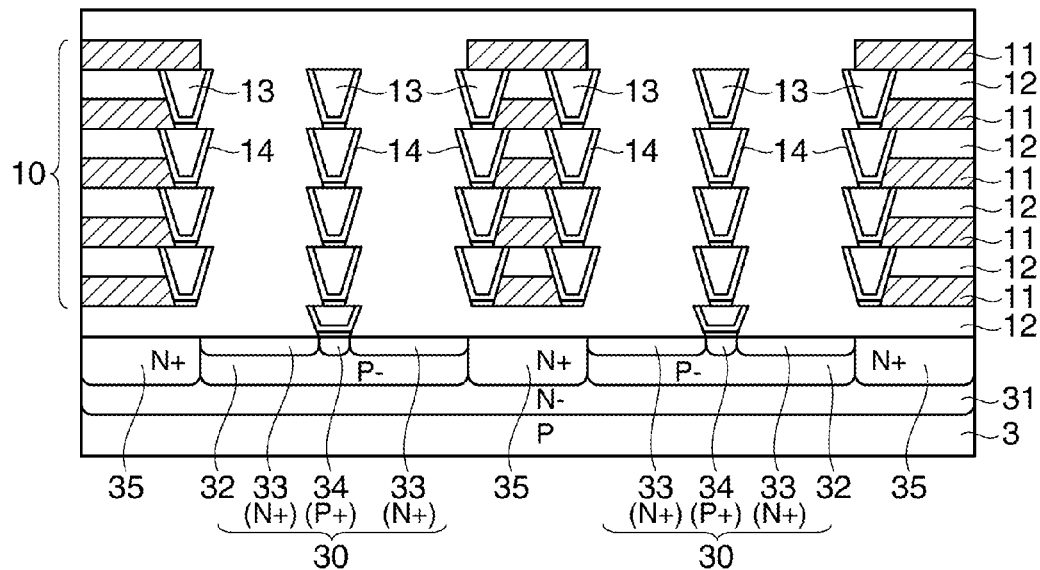
FIG. 3 is a schematic view of an angle restriction filter in accordance with a second embodiment.

FIG. 3 is a schematic view of an angle restriction filter in accordance with a second embodiment of the invention. FIG. 3 also shows a cross section of a photodetector device. In the second embodiment, the inclination angle of the wall surface of the optical path surrounded by the light shield members 13 (the inclination angle with respect to the direction perpendicular to the P type silicon substrate 3) is greater than the inclination angle in the first embodiment. Such a structure makes it harder for light having incident angles exceeding the restriction angle range to pass through the optical path.

In order to manufacture the angle restriction filter 10 having such a structure, when etching the silicon oxide layer 12 to form grooves therein in the manufacturing process described above, for example, etching with a stronger isotropic property may be conducted such that the inclination angle of the groove becomes greater. Other aspects are generally the same as those of the first embodiment.

3. Third Embodiment

Figure 4:
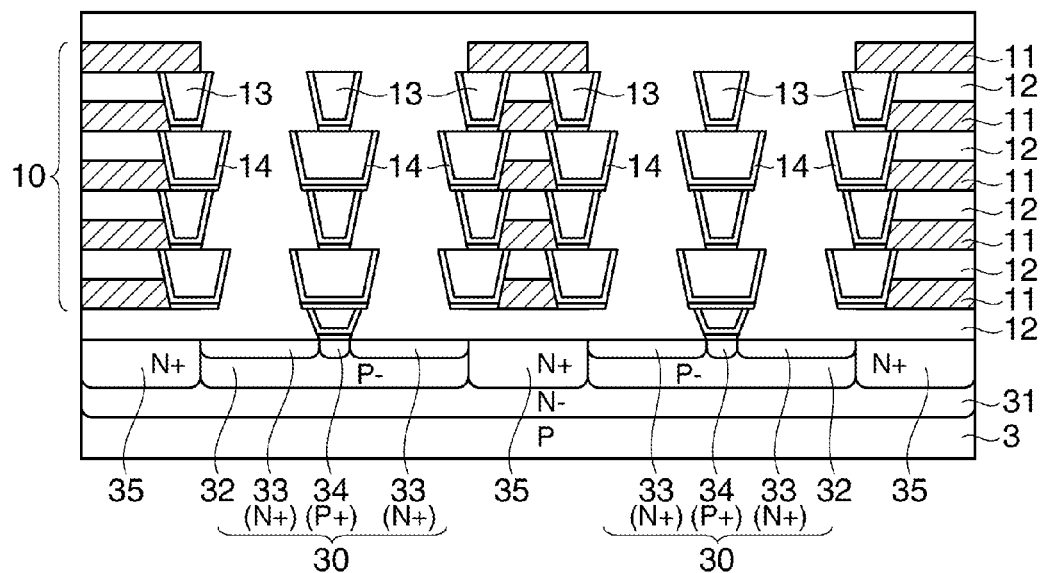
FIG. 4 is a schematic view of an angle restriction filter in accordance with a third embodiment.

FIG. 4 is a schematic view of an angle restriction filter in accordance with a third embodiment of the invention. FIG. 4 also shows a cross section of a photodetector device. In the third embodiment, the formed pattern of the light shield members 13 is changed at each layer (for example, the width of grooves formed in the silicon oxide layer 12 for embedding the light shield members 13 may be changed at each layer), thereby forming concave and convex portions on the wall surface of the optical path, which is different from the first embodiment. As the concave and convex portions are formed on the wall surface of the optical path, light that hits the wall surface of the optical path can be reflected in an opposite direction with respect to the incident direction. As a result, light with incident angles exceeding the restriction angle range can be dispersed, so that the reflected light is made difficult to reach the photodetector device 30. Other aspects are generally the same as those of the first embodiment.

4. Fourth Embodiment

Figure 5:
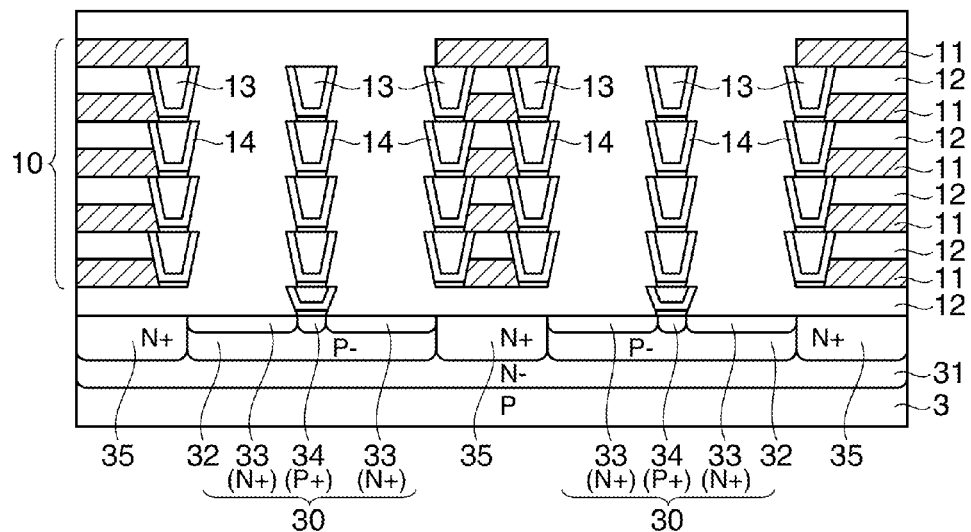
FIG. 5 is a schematic view of an angle restriction filter in accordance with a fourth embodiment.

FIG. 5 is a schematic view of an angle restriction filter in accordance with a fourth embodiment of the invention. FIG. 5 also shows a cross section of a photodetector device. In the fourth embodiment, the thickness of the titanium nitride film 14 formed around the light shield members 13 is greater than the thickness of the titanium nitride film 14 in the first embodiment. As a result, the reflectance of light at the wall surface of the optical path can be further reduced, such that light having incident angles exceeding the restriction angle range are made harder to pass through the optical path. Other aspects are generally the same as those of the first embodiment.

5. Fifth Embodiment

Figure 6:
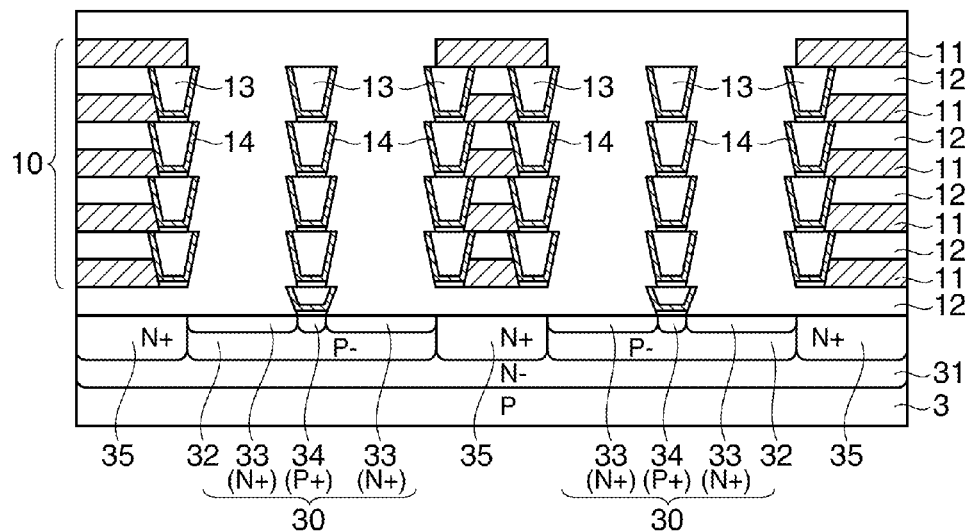
FIG. 6 is a schematic view of an angle restriction filter in accordance with a fifth embodiment.

FIG. 6 is a schematic view of an angle restriction filter in accordance with a fifth embodiment of the invention. FIG. 6 also shows a cross section of a photodetector device. In the fifth embodiment, the composition of the titanium nitride film 14 formed around the light shield members 13 is different from the composition of the titanium nitride film 14 in the first embodiment. For example, when the titanium nitride film 14 is formed by a CVD (chemical vapor deposition) method, the processing time for a plasma treatment to remove impurities including carbon (C) or its compounds may be made shorter than the normal processing time, or the plasma treatment may be omitted, whereby a titanium nitride film including impurities is intentionally formed. Alternatively, the compositions of the titanium nitride film 14 may be changed, or the content of nitrogen (N) in the titanium nitride film 14 may be lowered. Therefore, the reflectance of light at the wall surface of the optical path can be further reduced.

As a result, light with incident angles exceeding the restriction angle range can be made difficult to pass through the optical path. Other aspects are generally the same as those of the first embodiment.

6. Sixth Embodiment

Figure 7:
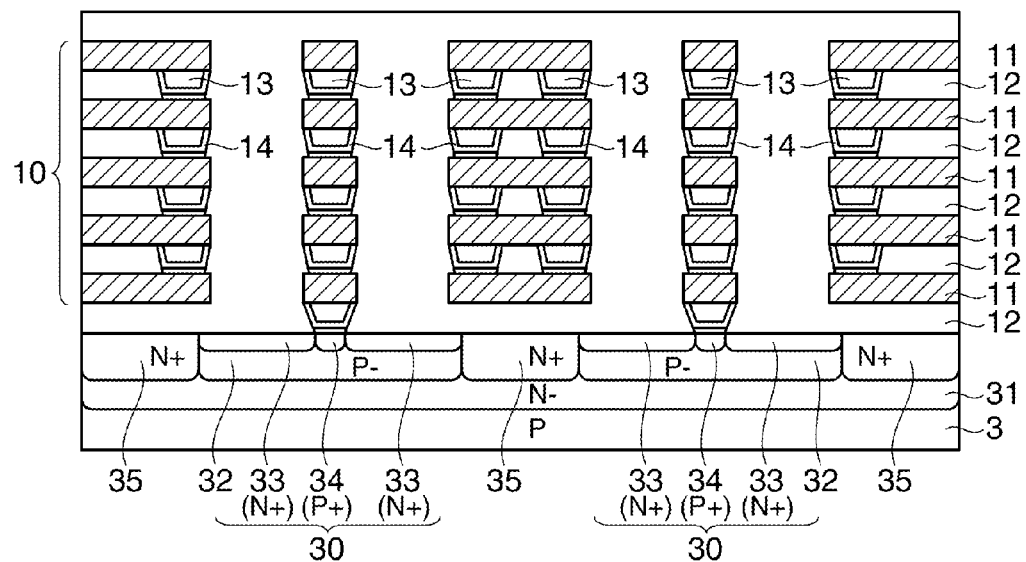
FIG. 7 is a schematic view of an angle restriction filter in accordance with a sixth embodiment.

FIG. 7 is a schematic view of an angle restriction filter in accordance with a sixth embodiment of the invention. FIG. 7 also shows a cross section of a photodetector device. In the sixth embodiment, the aluminum alloy layers 11 form a part of the wall surface of the optical path of the angle restriction filter 10, which differs from the first embodiment. More specifically, the optical path wall section of the angle restriction filter 10 forms an optical path with a plurality of aluminum alloy layers 11, and light shield members 13 formed between the plural aluminum alloy layers 11.

In order to manufacture the angle restriction filter 10 having such a structure, light shield members 13 in the second layer and above are formed on aluminum alloy layers 11, respectively. Other aspects are generally the same as those of the first embodiment.

In the sixth embodiment, portions of the wall surface of the optical path formed by the light shield members 13 are inclined with respect to a direction perpendicular to the P type silicon substrate 3. Accordingly, when light entering the optical path of the angle restriction filter 10 reflects at the light shield members 13, its reflection directions are made complex, and reflections are repeated many times until the incident light has passed through the optical path, such that the reflected light becomes weaker. Accordingly, light with incident angles exceeding the restriction angle range can be made difficult to pass through the optical path.

The angle restriction filter in accordance with the sixth embodiment may be combined with any one of the second through fifth embodiments, such that light with incident angles exceeding the restriction angle range can be made more difficult to reach the photodetector device 30. The angle restriction filter in accordance with any one of the second through sixth embodiments can be applied to the spectrum sensor in accordance with the first embodiment.

What is claimed is:

1. An angle restriction filter that allows light incident thereon in a predetermined range of incident angles to pass, comprising:
    an optical path wall section formed from a plurality of light shield members laminated in layers, thereby forming an optical path, wherein each light shield member has a cross-sectional shape wider at one end such that a surface forming a portion of the optical path wall is oriented slightly downward; and
    a light transmission section formed in a region surrounded by the optical path wall section.

2. An angle restriction filter according to claim 1, wherein the layers include a common material having a reflectance lower than a reflectance of aluminum.

3. An angle restriction filter according to claim 1, wherein the optical path wall section and the light transmission section are formed on a semiconductor substrate, and a plurality of metal layers are laminated respectively through dielectric layers in a region outside the optical path and the optical path wall section on the semiconductor substrate.

4. An angle restriction filter according to claim 3, wherein the light shield members are formed from a conductive material, and electrically connected to the plurality of metal layers.

5. An angle restriction filter according to claim 1, wherein the optical path defines a wall surface, the wall surface having an inclination section that inclines with respect to a direction perpendicular to the substrate.

6. An angle restriction filter according to claim 1, wherein each of the light shield members is provided on a surface thereof with a film formed from a material having a reflectance lower than a reflectance of aluminum.

7. An angle restriction filter according to claim 1, wherein the optical path defines a wall surface having concave and convex portions formed through changing a forming pattern of each of the light shield members at each layer.

8. A spectrum sensor comprising:
  the angle restriction filter recited in claim 1;
  a wavelength restriction filter that restricts wavelengths of light that passes through the angle restriction filter; and
  a photodetector device that detects light that has passed through the angle restriction filter and the wavelength restriction filter.

9. An angle restriction filter that restricts incident angles of light that passes through an optical path, comprising:
  an optical path wall section formed from a plurality of light shield members laminated in layers, thereby forming the optical path, wherein each light shield member has a cross-sectional shape wider at one end such that a surface forming a portion of the optical path wall is oriented slightly downward; and
  a light transmission section formed in a region surrounded by the optical path wall section.

10. An angle restriction filter according to claim 9, wherein the layers include a common material having a reflectance lower than a reflectance of aluminum.

11. An angle restriction filter according to claim 9, wherein the optical path wall section and the light transmission section are formed on a semiconductor substrate, and a plurality of metal layers are laminated respectively through dielectric layers in a region outside the optical path and the optical path wall section on the semiconductor substrate.

12. An angle restriction filter according to claim 11, wherein the light shield members are formed from a conductive material, and electrically connected to the plurality of metal layers.

13. An angle restriction filter according to claim 9, wherein the optical path defines a wall surface, the wall surface having an inclination section that is inclined with respect to a direction perpendicular to the substrate.

14. An angle restriction filter according to claim 9, wherein each of the light shield members is provided on a surface thereof with a film formed from a material having a reflectance lower than a reflectance of aluminum.

15. An angle restriction filter according to claim 9, wherein the optical path defines a wall surface having concave and convex portions formed through changing a forming pattern of each of the light shield members at each layer.

16. A spectrum sensor comprising:
  the angle restriction filter recited in claim 9;
  a wavelength restriction filter that restricts wavelengths of light that passes through the angle restriction filter; and
  a photodetector device that detects light that has passed through the angle restriction filter and the wavelength restriction filter.

\* \* \* \* \*